United States Patent [19]

Hedges

[11] 3,793,131
[45] Feb. 19, 1974

[54] FLEXIBLE INSULATED CONDUIT AND METHOD OF MAKING THE SAME
[75] Inventor: Lee Minor Hedges, Somerville, N.J.
[73] Assignee: Johns-Manville Corporation, New York, N.Y.
[22] Filed: Dec. 1, 1971
[21] Appl. No.: 203,764

[52] U.S. Cl............. 161/143, 138/119, 138/128, 138/156, 156/178, 156/213, 161/43, 161/44, 161/139, 161/141, 161/149
[51] Int. Cl............................. B32b 3/02, B32b 5/02
[58] Field of Search...... 52/404, 406, 309; 156/143, 156/178, 213; 161/43, 44, 139, 140–143, 149, 151; 138/118, 119, 121, 172, 173, 128, 156

[56] References Cited
UNITED STATES PATENTS

| 3,020,183 | 2/1962 | Calvaresi | 161/142 X |
| 874,494 | 12/1907 | Freese | 161/141 X |
| 3,183,996 | 5/1965 | Capaul | 161/141 X |
| 1,901,999 | 3/1933 | Upson | 161/149 X |
| 918,964 | 4/1909 | Chapin | 161/149 X |
| 1,984,814 | 12/1934 | Sherman | 161/141 X |
| 2,742,556 | 4/1956 | Bovenkerk | 161/44 X |
| 2,758,630 | 8/1956 | Hodge | 161/143 X |
| 3,210,234 | 10/1965 | Baskin et al. | 161/143 X |
| 3,546,846 | 12/1970 | Sens | 161/43 X |

Primary Examiner—William A. Powell
Attorney, Agent, or Firm—Johns-Manville Corporation

[57] ABSTRACT

The disclosure relates to a flexible, insulated conduit and the frame stock for the conduit. The frame stock comprises a pair of flexible facing sheets with a layer insulating material and a plurality of spaced-apart elongate stiffening elements disposed therebetween and bonded thereto. The frame stock is made by passing two continuous sheets of adhesively coated facing material, a continuous blanket of insulating material and a plurality of wires between pressure rolls with the blanket of insulating material and wires being disposed intermediate the facing sheets. The conduit is made by folding a sheet of frame stock into an enclosed passage and forming a flexible joint to unite the edges of the thus folded sheet.

8 Claims, 6 Drawing Figures

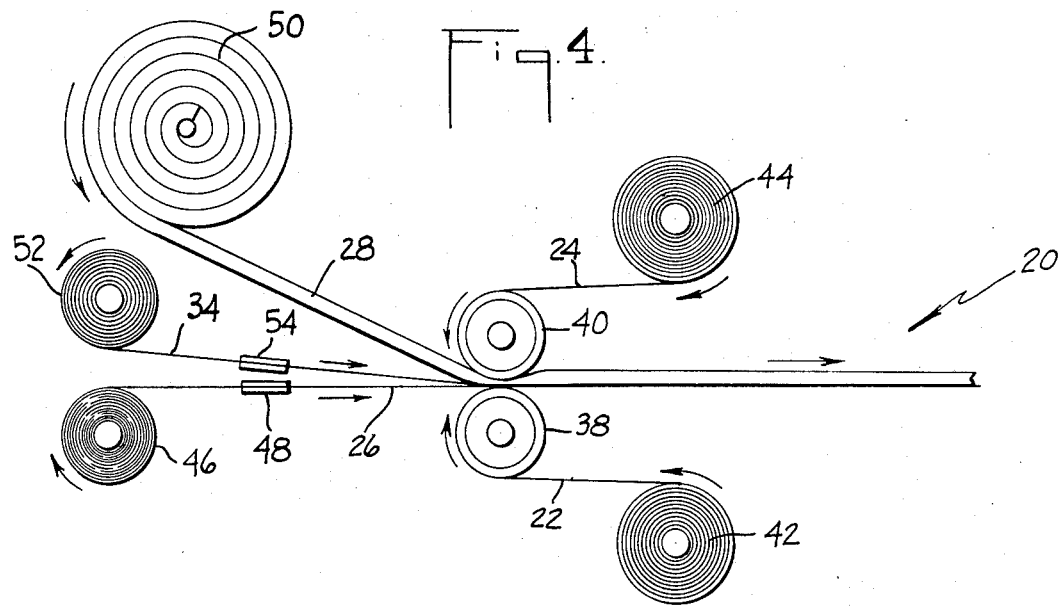
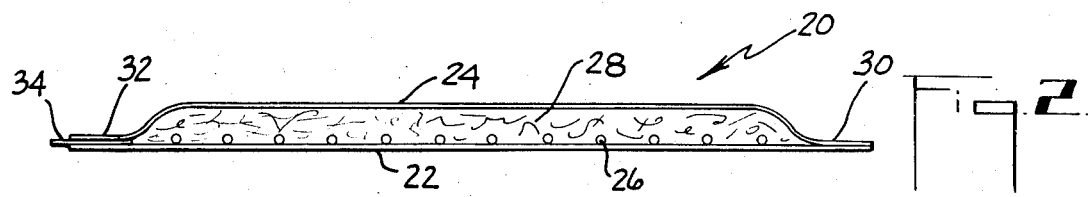
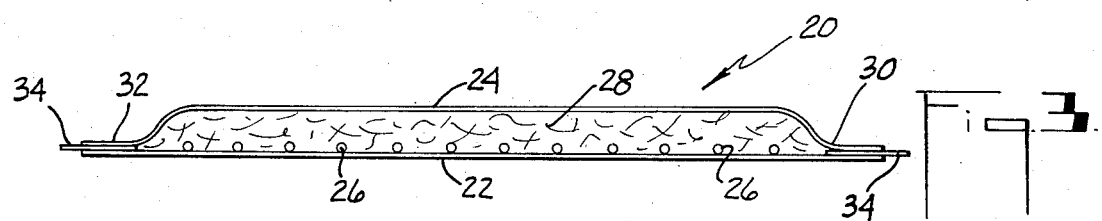
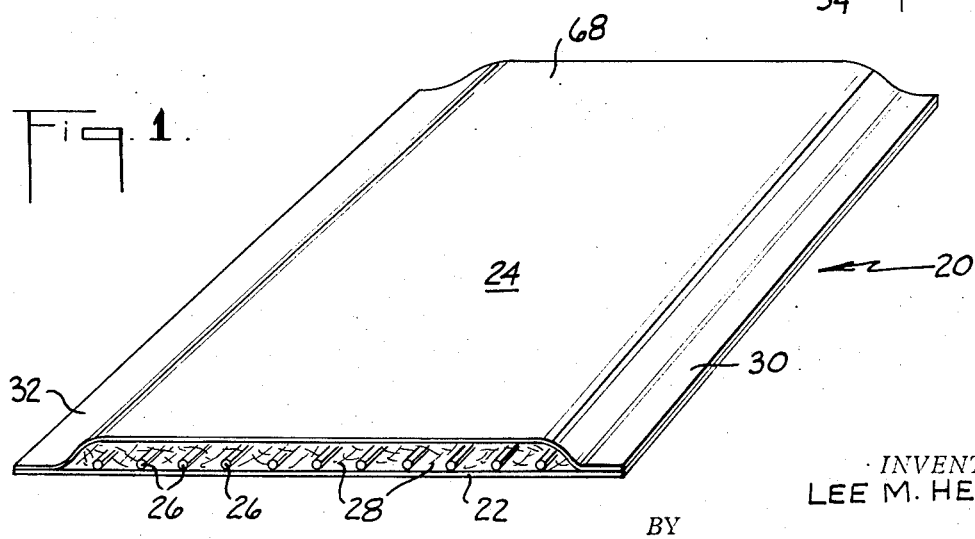
INVENTOR.
LEE M. HEDGES

INVENTOR.
LEE M. HEDGES

ATTORNEY 3,793,131

FLEXIBLE INSULATED CONDUIT AND METHOD OF MAKING THE SAME

BACKGROUND OF THE INVENTION

This invention relates to flexible, insulated conduits, the frame stock for such conduits and the method of making the frame stock. Due to their flexibility, these insulated conduits are well suited as connectors (e.g., elbows and other angular fittings) for duct systems in the air conditioning, heating and ventilating fields where insulated connectors are required.

Existing sheet metal conduits and flexible conduits with helical wire skeletons, generally, must be fabricated at a plant or shop and shipped in their bulky finished form to the job site. Thus, there has been a need for a frame stock which could be assembled in a factory, shipped to the job site in sheet form and readily fabricated at the job site into the desired shape for installation.

Applicant developed an improved conduit and method of making the conduit wherein the frame stock can be assembled in a factory, shipped in sheet form and fabricated at the job site into the conduit. This development is disclosed in Applicant's copending application Ser. No. 144,185, entitled FLUID CONDUIT, filed May 17, 1971, now abandoned. That application discloses a flexible, insulated frame stock, a flexible insulated conduit and a method of making same. The frame stock for the conduit disclosed in that application comprises a pair of adhesively coated facing sheets with elongate stiffening elements therebetween plus a layer of insulating material sandwiched between one of the facing sheets and a third facing sheet.

The stiffening elements must be maintained in their set positions throughout the formation of the frame stock into the conduit and during any subsequent flexing of the conduit. It was originally thought that the stiffening elements could only be adequately secured by completely enveloping the stiffening elements with the facing sheets to adhesively secure the stiffening elements to both sheets. However, it was subsequently found that the reinforcing elements will stay in place when bonded to only a single facing sheet thereby enabling the elimination of one of the facing sheets.

Consequently it is an object of this invention to provide a flexible, insulated conduit which retains all of the advantages over the prior art of the conduit disclosed in Applicant's copending application and yet effect a substantial cost reduction by eliminating one-third of the facing material and adhesive previously required.

Another object is to provide a flexible insulated conduit which, when bent, has a smoother internal surface to reduce the friction loss of fluid passing through the conduit.

A further object is to provide a flexible, insulated conduit wherein the insulation is firmly secured to both facing sheets and thereby held permanently in place.

BRIEF SUMMARY OF THE INVENTION

The present invention relates to flexible, insulated frame stock for forming conduit, the conduit formed, and the method of making the frame stock. The frame stock comprises a pair of facing sheets with a layer of insulating material and a plurality of spaced-apart elongate stiffening elements disposed therebetween and bonded thereto. The elongate stiffening elements extend parallel to the longitudinal axis of the frame stock and can be formed by bending, into the desired cross section of the conduit. In the conduit, the stiffening loops formed from the stiffening elements are located in planes perpendicular to the longitudinal axis of the conduit and thereby prevent radial collapse of the conduit while allowing the conduit to be collapsed in an axial direction, twisted or flexed.

The frame stock is assembled by passing two continuous sheets of adhesively coated facing material between pressure rolls with the adhesively coated surfaces of the facing sheets opposing each other. Prior to the passage of the facing sheets between the pressure rolls, a continuous blanket of insulating material and a plurality of continuous parallel wire elements are fed intermediate the facing sheets. Thus, the passage of these components through the pressure rolls bonds them together to form the frame stock.

BRIEF DESCRIPTION OF THE DRAWINGS

The invention will be more fully understood and further objects and advantages thereof will become apparent from the following detailed description of a preferred embodiment of the invention and the accompanying drawings in which:

FIG. 1 is a perspective view of frame stock of the present invention having no metal collar strips and showing one of the two edges which are joined to form the longitudinal seam of the conduit;

FIG. 2 is a cross-sectional view of frame stock of the present invention having one metal collar strip;

FIG. 3 is a cross-sectional view of frame stock of the present invention having two metal collar strips;

FIG. 4 is a schematic representation of a process for the manufacture of the frame stock disclosed herein;

DETAILED DESCRIPTION OF THE PREFERRED EMBODIMENT

Figure 6:
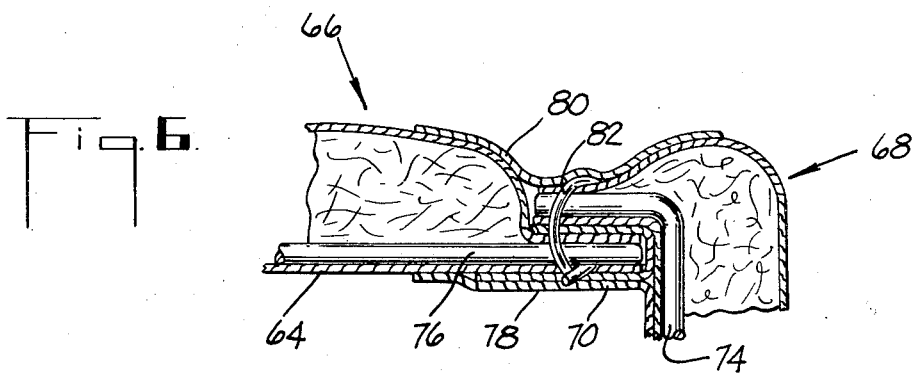
FIG. 6 is a sectional view along lines 6—6 of FIG. 5 to show how the edges of the frame stock are joined to form the longitudinal seam of the conduit.

Referring to FIG. 1 of the drawings, frame stock 20 of the present invention is illustrated in perspective. The frame stock 20 comprises facing sheets 22 and 24, a plurality of wire stiffening elements 26 and a layer 28 of insulating material. The wire stiffening elements 26 and the layer 28 of insulating material are disposed intermediate the facing sheets 22 and 24 and adhesively secured in place.

The facing sheets 22 and 24 are flexible, fluid impervious and coated on their inwardly facing surfaces with a pressure sensitive adhesive. One material for the facing sheets has a cloth backing laminated to a polyethylene film. One surface of the material is coated with a pressure sensitive water insoluble adhesive having a rubber and resin base. Although this material has been found to be satisfactory, it is contemplated that other adhesive coated materials can also be utilized.

The sheets 22 and 24 extend beyond side edges of the insulating layer 28 and the outer most stiffening elements 26 a distance (e.g., 2 ½ inches) sufficient to form collar strips 30 and 32. As shown in FIG. 1, the collar strips 30, 32 of the facing sheets can be fabric collar strips formed by bonding together the extended portions of the facing sheets on each side of the frame stock. However, if a stiffer collar strip is desired on one or both sides of the frame stock, metal collar reinforcing strips 34 can be interposed between and bonded to the extended portions of the facing sheets on one side (FIG. 2) or both sides (FIG. 3). As shown the collar reinforcing strips 34 generally extend beyond the edges of the facing sheets 22,24. However, the collar reinforcing strips 34 can have the same width as the extended portions of the facing sheets.

The stiffening elements 26 are bonded to facing sheet 22 in spaced-apart parallel relationship. The stiffening elements 26 are ductile so that once they have been bent they retain their shape. The spacing of the stiffening elements depends on the degree of reinforcement required and the gauge of the wire utilized. However, spacings of one inch have proved satisfactory. The elements are bonded or affixed to facing sheet 22 so that they permanently retain their relative positions on the facing sheet during formation of conduit 36 and later flexing and/or twisting of the conduit 36.

The layer 28 of insulation is bonded to both facing sheets and surrounds the stiffening elements 26 on three sides. With this construction the insulation is firmly adhered to the facing sheets and is securely retained in position.

The insulating layer 28 can be a blanket of glass fiber insulation or any other suitable insulating material. However, the insulating layer 28 should be capable of recovering from compression without undue fiber breakage or significant losses in its insulating properties. The type of insulation used and its thickness will depend on the insulating requirements of its intended use.

Referring now to FIG. 4, a process of manufacturing frame stock 20 is illustrated. Rubber faced pressure rolls 38 and 40 are provided to activate the pressure sensitive adhesive on facing sheets 22 and 24 and thereby join the facing sheets 22 and 24, the stiffening elements 26, the insulation layer 28 and the collar strips 30, 32 together. The pressure rolls 38 and 40 extend for at least the entire width of the facing sheets and apply pressure across the whole width of the facing sheets sufficient to assure that the stiffening elements 26, insulating layers 28 and the portions of the facing sheets forming the collar strips 30,32 are firmly adhered together. Material for facing sheets 22 and 24 is contained on rolls 42 and 44 respectively and passes from these rolls part of the way around and between the pressure rolls 38 and 40. The adhesively coated surfaces of the facing sheets oppose each other as they pass between the pressure rolls where they are joined to the stiffening elements 26, the insulating layer 28 and to each other or metallic collar reinforcing strips 34.

Wire for the stiffening elements 26 is contained on a plurality of spools 46. As shown, the spools 46 have a common axis of rotation. However, depending on the widths of the spools and the desired spacing of the stiffening elements 26, the spools can be staggered so that they will not interfere with each other.

Wire guides and straighteners 48 straighten the wires for the stiffening elements and direct the wires between the pressure rolls 38 and 40. The wires are directed between the rolls in parallel spaced-apart relationship with the wires resting on the adhesively coated surface of facing sheet 22 as they enter the pressure rolls. In this way, the wires become firmly bonded to facing sheet 22 as the wires and facing sheet pass through the pressure rolls.

The blanket of material for the insulating layer 28 is contained on roll 50. The blanket of insulating material is guided from this roll to the pressure rolls 38 and 40 with the blanket being interposed between the wires of the stiffening elements 26 and facing sheet 24. As the blanket passes through the pressure rolls, the wires which form the stiffening elements 26 of the frame stock act as knives under the pressure of the pressure rolls to cut or slit the blanket. However, this has no deleterious effect on the insulation between the wires as the insulating is firmly adhered to both facing sheets and consequently retains its integrity and position during formation of the conduits 36 and later handling and/or flexing of the conduits. The insulation is centered on the facing sheets and is narrower than the facing sheets by a width twice that of the collar width for the intended conduit. In practice, since collar strips 30 and 32 have been made approximately 1 ½ inches wide, the insulation is 3 to 4 inches narrower than the facing sheets. In this way the strips of the facing sheets adjacent the side edges of the frame stock can be bonded together or to a metallic collar reinforcing strip 34 to form collar strips 30 and 32 for later fabrication of conduit collars.

Whem metal reinforcing strips 34 are going to be used in collar strips 30 and 32, the material for the strips is contained on rolls 52. Strip straighteners and guides 54 straighten the metal strips and direct the strips between the pressure rolls 38 and 40. The straightener and guide assemblies 54 guide the metal strips parallel to the wires for the stiffening elements 26 so that the metal strips are interposed between the extended portions of the facing sheets as they enter the pressure rolls. Thus, as the strips and sheets pass through the pressure rolls, the reinforcing strips 34 are firmly bonded to the extended portions of the sheets by the pressure sensitive adhesive to reinforce the collar strips 30 and 32.

After the facing sheets 22 and 24, stiffening elements 26, insulation layer 28, and collar strips 30,32 (with or without collar reinforcing strips 34) have been assembled, the frame stock 28 is cut in predetermined lengths and packaged for shipment to the job site. The length of the stock depends on the peripheral length of the opening of the conduit to be assembled.

Figure 5:
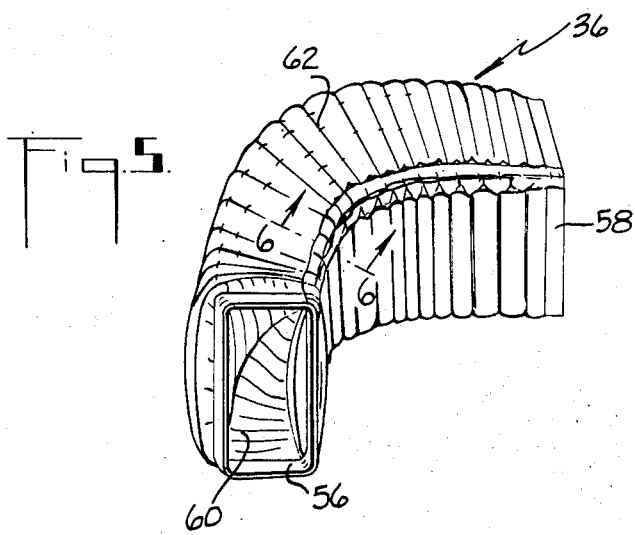
FIG. 5 is a perspective view of conduit of the present invention.

The conduit 36, which is shown in FIG. 5, is a flexible conduit with a pair of collars 56 and 58 formed from collar strips 30 and 32. Facing sheets 22 and 24 form the interior and exterior walls 60 and 62 of the conduit respectively with the insulating layer 28 disposed intermediate the walls.

The stiffening elements 26 form the reinforcing or stiffening loops 64 which are located in planes perpendicular to the longitudinal axis of the conduit and adhesively secured to a radially outward surface of interior wall 60. The loops 64 are spaced apart with the flexible interior wall 60 interconnecting adjacent loops. Thus, the conduit has a smooth interior surface and the spaced apart loops 64 prevent radial collapse of the conduit while permitting the conduit to be collapsed in an axial direction, bowed and/or twisted.

The conduit 36 also has a flexible longitudinal seam which is formed by joining the transverse raw edge portions 66 and 68 of the frame stock. The seam, as shown in FIG. 6, extends along a corner of the conduit. However, the seam can also be formed intermediate corners of the conduit.

Edge portion 66 is enclosed within a tape strip 70 to hold the edge portion together during assembly and provide a cover for ends of the stiffening loops 64. Edge portion 68 has the facing sheets stapled together (not shown) intermediate the other ends of the stiffening loops 64 to hold the edge portion together during assembly. The edge portions 66 and 68 of the frame stock overlap with edge portion 66 abutting the inner surface of conduit wall 60 adjacent the other edge portion 68. Tape strip 70 prevents the ends of the stiffening loops 64 from penetrating the inner wall. Edge portion 68 is folded over edge portion 66, forming a corner of the conduit, and extended parallel to the inner edge portion 66. The ends of stiffening loops 64 overlap in a similar manner with one end 74 of each stiffening loop being folded over and extending parallel to the other end 76 of the loop to form an overlap of the loop ends adjacent the corner. The overlapping edge portions 66 and 68 are joined by interior and exterior pressure sensitive tapes 78 and 80 which extend the length of the conduit. The tapes 78 and 80 are superimposed on the interior and exterior edge portions 66 and 68 and the adjacent surfaces of the interior and exterior walls 60 and 62 respectively. Thus, these tapes both secure the edge portions 66 and 68 together and seal the longitudinal seam. In addition to the tapes, staples 82 can be used to secure the adjacent ends of the stiffening loops 64 together. These staples can be used to join the ends of all or only some of the stiffening loops together as required.

The conduit 36 shown in FIG. 5 is formed by selecting a length of frame stock 20 equal to the peripheral distance desired for the collars 56 and 58 of the conduit plus the width needed for the overlap at the seam. Edge portion 66 is taped to enclose the edge and hold the edge portion together during formation of the conduit. The facing sheets of edge portion 68 are stapled together intermediate the ends 74 of the stiffening loops 64 to hold the edge portion together as the conduit is being formed. Next, the frame stock 20 is folded along lines transverse to the longitudinal axis of frame stock and the stiffening elements 26. Where it is desired to have collars at each of the same configuration, the fold lines are perpendicular to the longitudinal axis of the frame stock. Where it is desired to have the configurations different, the fold lines are located at angles to the longitudinal axis other than right angles.

The frame stock is folded so that the edge portion 68 overlaps and extends parallel to edge portion 66 at a corner of the conduit and the edge portion 66 abuts the interior surface of wall 60 at the corner. As the frame stock is folded the insulating layer is drawn back somewhat from edge portion 68 thereby facilitating the stapling together of the ends 74 and 76 of the stiffening loops 64 when staples 82 are used to help join the edge portions together. After the frame stock has been folded and the staples put in place, if used, the tapes 78 and 80 are placed over the edge portions and adjacent portions of the exterior and interior wall surfaces of the conduit to complete the formation of the seam.

While the cross-sectional configuration of the conduit 36 shown in FIG. 5 is rectangular, the cross-sectional configuration can be varied as desired (e.g., square, round, etc.). The conduits 36 are collapsible in the axial direction with the stiffening loops 64 preventing radial collapse of the conduit. The conduits can also be flexed and twisted to properly orient the collars of the conduit with other ducts to be joined.

I claim:
1. Frame stock for folding and forming into conduit comprising:
   a a first and second flexible facing sheets,
   b a plurality of elongate stiffening elements disposed intermediate said facing sheets, said stiffening elements being adjacent said first facing sheet and said stiffening elements being substantially parallel with respect to each other and secured to said first facing sheet at spaced-apart locations along said facing sheet whereby the frame stock can be collapsed in a direction transverse to the longitudinal extent to the stiffening elements, and said stiffening elements being bendable and adapted to retain their shape once said elements have been bent,
   c a layer of thermal insulating material disposed intermediate said facing sheets,
   d a pair of collar strips comprising edge portions of said facing sheets which extend parallel with respect to the elongate stiffening elements, and
   e means joining said facing sheets.

2. The frame stock of claim 1 wherein said stiffening elements are adhesively secured to said first facing sheet and said insulating layer is adhesively secured to said facing sheets.

3. The frame stock of claim 1 wherein said collar strips extend beyond the outermost stiffening elements and said insulating layer.

4. The frame stock of claim 3 wherein said collar strips are said lateral edge portions of said facing sheets adhesively secured together.

5. The frame stock of claim 3 wherein one of said collar strips has a reinforcing strip secured thereto.

6. The frame stock of claim 3 wherein one of said collar strips has a reinforcing strip disposed intermediate and adhesively bonded to said facing sheets.

7. The frame stock of claim 3 wherein reinforcing strips are secured to both of said collar strips.

8. The frame stock of claim 3 wherein said collar strips have reinforcing strips disposed intermediate and adhesively bonded to said facing sheets.

* * * * *